United States Patent [19]

Washio et al.

[11] 4,134,075
[45] Jan. 9, 1979

[54] AMPLITUDE-AND-PHASE DEMODULATOR COMPRISING A QUANTIZATION CIRCUIT

[75] Inventors: Makoto Washio, Yokohama; Tadao Shimamura, Tokyo, both of Japan

[73] Assignees: Nippon Telegraph & Telephone Public Corporation; Nippon Electric Co., Ltd., both of Tokyo, Japan

[21] Appl. No.: 865,548

[22] Filed: Dec. 29, 1977

[30] Foreign Application Priority Data

Dec. 29, 1976 [JP] Japan .................................. 51-160726

[51] Int. Cl.² ............................................. H03D 3/00
[52] U.S. Cl. ....................................... 329/135; 329/124
[58] Field of Search ............... 329/112, 122, 124, 135; 331/12

[56] References Cited

U.S. PATENT DOCUMENTS

| 3,748,590 | 7/1973 | Gray ..................... 329/124 |
| 3,970,946 | 7/1976 | Matsuo ................... 329/135 |
| 4,085,378 | 4/1978 | Ryan et al. ............... 331/12 |

Primary Examiner—John Kominski
Attorney, Agent, or Firm—Sughrue, Rothwell, Mion, Zinn and Macpeak

[57] ABSTRACT

For a pair of detection signals derived by coherent quadrature detection from an amplitude-and-phase modulated signal, a demodulator comprises a pair of quantizer sections each of which produces a quantized signal serving as a part of a regenerated data signal, a quantization error signal, and a "first path" signal given by that portion of the quantized signal which indicates one and the other of the plus and the minus sides of the signal reference plane known in the art. The signals produced by the quantizer sections are used to control a voltage controlled oscillator for reproducing a carrier signal for use in the coherent detection. Each quantizer section may comprise at least one quantization circuit and at least one quantization error deriving subtractor. Alternatively, the quantization may be carried out in a space or a time division fashion.

4 Claims, 5 Drawing Figures

PRIOR ART

AMPLITUDE-AND-PHASE DEMODULATOR COMPRISING A QUANTIZATION CIRCUIT

BACKGROUND OF THE INVENTION

This invention relates to a demodulator for demodulating an input signal subjected to amplitude-and-phase modulation.

With the amplitude-and-phase modulation technique, it is possible to transmit a plurality of digital signal series which are independent of one another. As will later be described with reference to a figure of the accompanying drawing, an amplitude-and-phase modulated signal includes, besides quadrature phase components spaced in the modulated signal by a $2\pi/4$ radian phase interval, a plurality of additional components. In a conventional amplitude-and-phase demodulator, the amplitude-and-phase modulated signal supplied thereto as an input signal is demodulated by the use of a pair of reference carrier signals, one of which is in quadrature phase relative to the other and which are recovered from the input signal. An error component inevitably remains in the recovered reference carrier signals due to the additional components. Consequently, the conventional demodulator is defective in that jitters are inevitable in the recovered reference carrier signals although the circuitry for recovering the reference carrier signals is complicated in structure to render the demodulator expensive. As a further result, the conventional demodulator has been incapable of reproducing the digital signal series with high precision.

SUMMARY OF THE INVENTION

It is therefore an object of this invention to provide a demodulator for an amplitude-and-phase modulated signal, wherein a reduction of jitters is possible in a reference carrier signal recovered in the demodulator from the amplitude-and-phase modulated signal for use in carrying out the demodulation.

It is another object of this invention to provide an amplitude-and-phase demodulator of the type described, which is capable of carrying out the demodulation with high precision.

It is still another object of this invention to provide an amplitude-and-phase demodulator of the type described, which is simpler in structure and less expensive than a conventional amplitude-and-phase demodulator.

According to one aspect of this invention, it is possible to raise the speed of the demodulation.

A demodulator to which this invention is applicable is for an input signal of input levels and input phases subjected to amplitude-and-phase modulation and comprises variable frequency means responsive to a control signal for producing a first reference carrier signal of a frequency and a first phase dependent on the control signal and a second reference carrier signal of the frequency and a second phase having a quadrature phase difference relative to said first phase, first coherent detection means responsive to the first reference carrier signal for detecting the input signals to produce a first detection signal of a first detection level dependent on said input levels and input phases, and second coherent detection means responsive to the second reference carrier signal for detecting said input signals to produce a second detection signal of a second detection level dependent on said input levels and input phases. Each of the first and second detection levels varies between a predetermined highest and a predetermined lowest level, inclusive, on both sides of an intermediate level preselected between the highest and lowest levels. According to this invention, the demodulator comprises first means responsive to at least one reference level comprising the intermediate level and to the first detection signal for producing a first quantized signal, a first coded signal, and a first quantization error signal, the first quantized signal having one of a plurality of quantization levels predetermined between said highest and lowest levels that is determined by the first detection level to be equal thereto with a first minimum difference, the first coded signal being representative of a first and a second predetermined value when the first detection level is between said highest and intermediate levels and between said intermediate and lowest levels, respectively, the first quantization error signal being representative of said first difference, second means responsive to the at least one reference level and to said second detection signal for producing a second quantized signal, a second coded signal, and a second quantization error signal, the second quantized signal having one of the quantization levels that is determined by said second detection level to be equal thereto with a second minimum difference, the second coded signal being representative of the first and second predetermined values when the second detection level is between the highest and intermediate levels and between the intermediate and lowest levels, respectively, the second quantization error signal is representative of said second difference, a first multiplier for multiplying the first quantization error signal by the second coded signal to produce a first product signal, a second multiplier for multiplying the second quantization error signal by the first coded signal to produce a second product signal, a subtractor for subtracting one of the first and second product signals from the other to produce a difference signal, means for supplying the difference signal to the variable frequency means as the control signal, and, means for producing the first and second quantized signals as the regenerated data signals.

DESCRIPTION OF THE PREFERRED EMBODIMENTS

Figure 1:
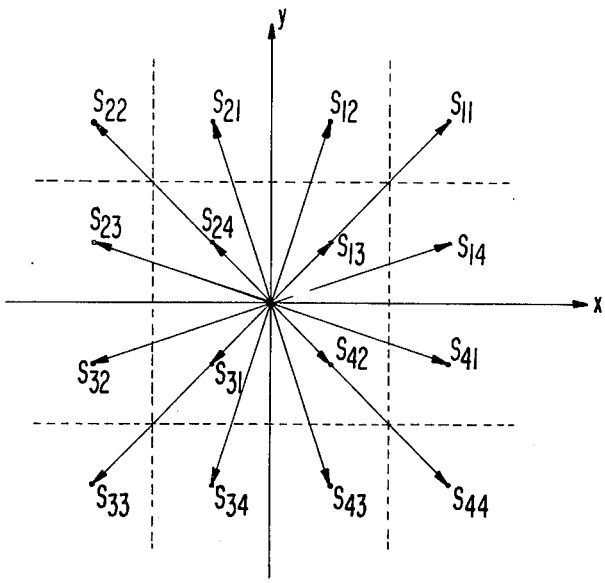
FIG. 1 shows a signal space diagram for an amplitude-and-phase modulated signal.

Referring to FIG. 1, description will be made of an amplitude-and-phase modulated signal to be demodulated by a demodulator according to this invention. Use is made of a reference signal plane known in the art and of a rectangular x-y coordinate system on the reference signal plane. The amplitude-and-phase modulated signal is derived in a counterpart modulator for modulating a carrier signal of a carrier frequency by a digital signal and is represented by a plurality of signal vectors which are extended from an origin O of the coordinate system and have different phases or arguments and/or different magnitudes or absolute values. In the example being illustrated, sixteen signal vectors $OS_{11}$, $OS_{12}$, $OS_{13}$, $OS_{14}$, $OS_{21}$, $OS_{22}$, $OS_{23}$, $OS_{24}$, $OS_{31}$, $OS_{32}$, $OS_{33}$, $OS_{34}$, $OS_{41}$, $OS_{42}$, $OS_{43}$, and $OS_{44}$ (arrows on the reference characters omitted for convenience of printing) are illustrated, four signal vectors in each of the first through fourth quadrants. The end points $S_{11}$ and so forth of the signal vectors are representative of information points, which are located like lattice points with an identical distance between two adjacent points both along the x and y axes. The information points $S_{11}$ and so on are thus placed in those sixteen signal areas, respectively, into which the reference signal plane is divided by the x and y axes into four major signal areas and by four broken lines into four minor signal areas at each of the major signal areas. It is consequently possible to discriminate between the information points by detecting the major and minor signal areas. On the other hand, it is possible to identify each of the signal areas by a combination of four-bit digital codes. The illustrated amplitude-and-phase modulated signal is therefore called a four-by-four quadrature amplitude modulated signal.

Figure 2:
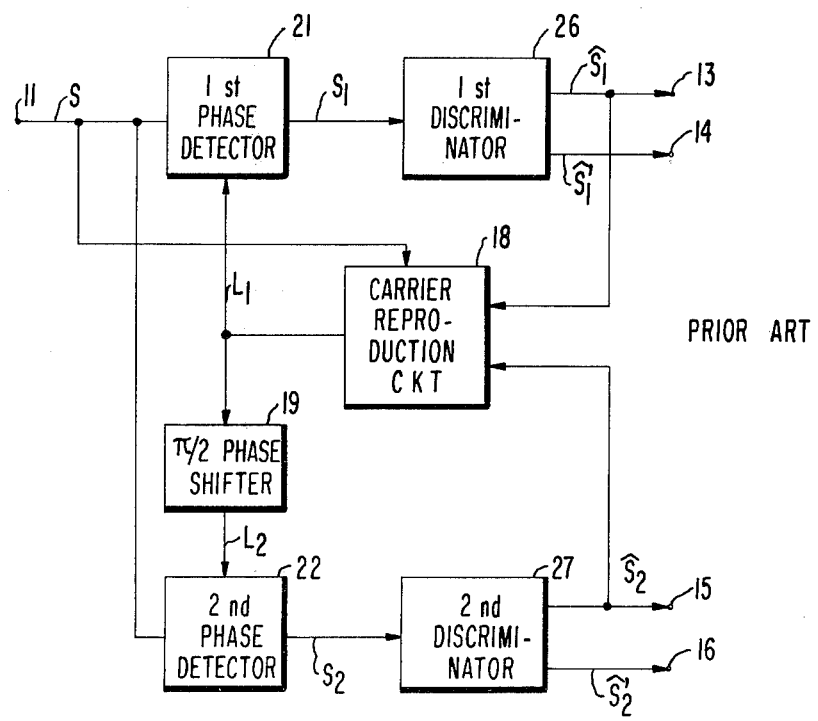
FIG. 2 is a block diagram of a conventional demodulator for the amplitude-and-phase modulated signal.

Referring to FIG. 2, a conventional demodulator for a four-by-four quadrature amplitude modulated signal is illustrated for a better understanding of this invention. It is assumed here that the digital signal which results in the amplitude-and-phase modulated signal has a predetermined repetition frequency. Responsive to the amplitude-and-phase modulated signal supplied to an input terminal 11 as an input signal S, the demodulator delivers regenerated data signals to first and second output terminal pairs 13, 14 and 15, 16. As will later be described, the regenerated data signals consist of a first output signal pair $\hat{S}_1$ and $\hat{S}_1'$ and a second output signal pair $\hat{S}_2$ and $\hat{S}_2'$, each output signal pair consisting of more significant output signals $\hat{S}_1$ and $\hat{S}_2$ indicative of one of the major signal areas in which the information point is present and less significant output signals $\hat{S}_1'$ and $\hat{S}_2'$ representative of one of the four minor signal areas in the indicated major signal area in which the information point is present.

The demodulator shown in FIG. 2 comprises a carrier reproduction circuit 18 responsive to the input signal S and the more significant output signals $\hat{S}_1$ and $\hat{S}_2$ for producing a first reference carrier signal $L_1$. As the carrier reproduction circuit 18, use is possible of various kinds of circuits known in the art, such as a circuit comprising either a re-modulation and comparison loop or a reverse modulation loop for processing the input signal S in the carrier frequency band. Alternatively, the carrier reproduction circuit 18 may be a circuit described by J. P. Costas in "Proceedings of the IRE," Vol. 144, pp. 1713–1718 (December 1956), under the title of 'Synchronous Communication.' The circuit described by Costas processes the input signal S substantially in the baseband. By way of example, it is assumed here that the carrier reproduction circuit 18 comprises a voltage controlled oscillator for producing a reference carrier of a frequency approximately equal to the carrier frequency of the input signals, a re-modulator for modulating the reference carrier by the more significant output signals $\hat{S}_1$ and $\hat{S}_2$ to produce a re-modulated signal, a phase comparator for comparing the re-modulated signal with the input signal S to produce a control signal dependent on the phase difference between the re-modulated and input signals, and means for supplying the control signal to the voltage controlled oscillator to make the latter produce a first reference carrier signal $L_1$. The demodulator further comprises a $\pi/2$ phase shifter 19 for shifting the phase of the first reference carrier signal $L_1$ by $\pi/2$ to produce a second reference carrier signal $L_2$.

Further referring to FIG. 2, the demodulator comprises first and second phase detectors 21 and 22 responsive to the respective ones of the first and second reference carrier signals $L_1$ and $L_2$ for carrying out coherent detection of the input signal S to produce first and second detection signals $S_1$ and $S_2$, respectively, which are representative of the x and y components, respectively, of the signal vectors $OS_{11}$ and so forth (FIG. 1). Each of the detection signals $S_1$ and $S_2$ takes one of four different detection levels at a time in accordance with the input signal S. Supplied with the detection signals $S_1$ and $S_2$, each of first and second discriminators 26 and 27 discriminates between two major signal areas to produce the more significant output signal $\hat{S}_1$ or $\hat{S}_2$ and between two minor signal areas with reference to each of the more significant output signals $\hat{S}_1$ and $\hat{S}_2$ to produce the less significant output signal $\hat{S}_1'$ or $\hat{S}_2'$. No jitter occurs in the first and second reference carrier signals $L_1$ and $L_2$ if components of the input signal S were to occur at every $2\pi/4$ interval. Components of the input signal S, however, appear in practice at intervals other than $2\pi/4$ due to the amplitude-and-phase modulation. Jitters are therefore inevitable despite the complicated structure of the carrier reproducing circuit 18.

Figure 3:
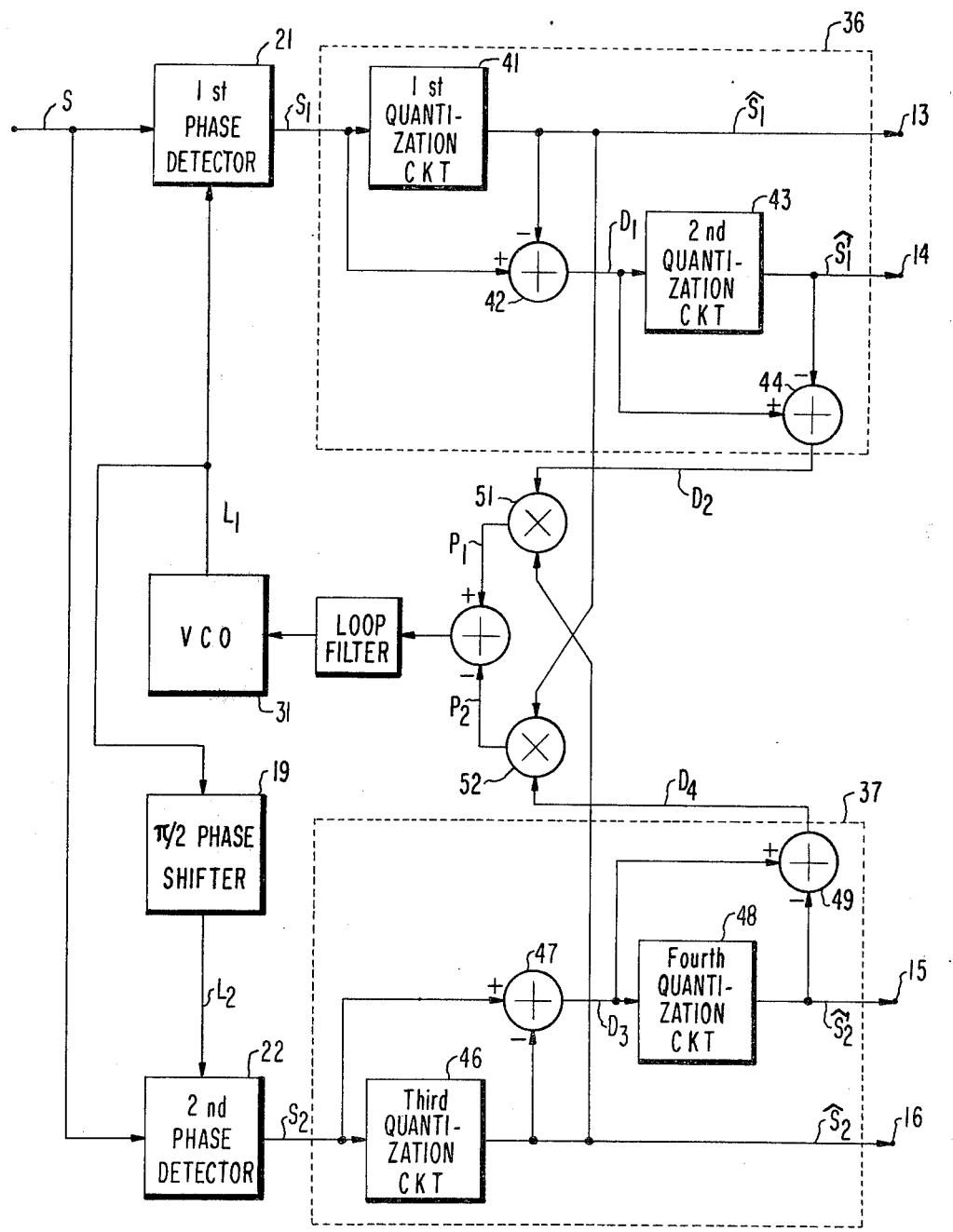
FIG. 3 is a block diagram of a demodulator according to a first embodiment of this invention.

Referring now to FIG. 3, a demodulator according to a first embodiment of this invention is again for an amplitude-and-phase modulated signal illustrated with reference to FIG. 1. As is the case with the conventional demodulator described in conjunction with FIG. 2, the demodulator shown in FIG. 3 comprises an input terminal 11 supplied with the amplitude-and-phase modulated signal as an input signal S, a first output terminal pair 13 and 14 for first more significant and less significant output signals $\hat{S}_1$ and $\hat{S}_1'$, a second output terminal pair 15 and 16 for second more significant and less significant output signals $\hat{S}_2$ and $\hat{S}_2'$, a $\pi/2$ phase shifter 19, and first and second phase detectors 21 and 22 for producing first and second detection signals $S_1$ and $S_2$. Instead of the carrier reproduction circuit 18, the illustrated demodulator comprises a voltage controlled oscillator 31 responsive to a control signal C described later for producing a first reference carrier signal $L_1$ to make the phase shifter 19 produce a second reference carrier signal $L_2$.

For convenience of further description, the input signal S is given by:

$$S = G_{11}\cos\omega_c t + G_{12}\sin\omega_c t + (G_{21}\cos\omega_c t + G_{22}\sin\omega_c t)/2, \qquad (1)$$

where each of $G_{11}$, $G_{12}$, $G_{21}$, and $G_{22}$ represents a data pulse signal which takes one of two signal levels $+1$ and $-1$ at a time and by which the carrier signal of an angular frequency $\omega_c$ is modulated. Also, a combination of the data pulse signals $G_{11}$ and $G_{12}$ is called a first path signal while another combination of the data pulse signals $G_{21}$ and $G_{22}$, a second path signal. It is now understood that input levels and phases of the input signal S are dependent on the data pulse signals $G_{11}$ through $G_{22}$. Inasmuch as the control signal C is produced in the manner described hereunder, the first and second reference carrier signals $L_1$ and $L_2$ are given by:

$$L_1 = \cos(\omega_c t + \phi_e) \quad (2)$$

and $$L_2 = \sin(\omega_c t + \phi_e),$$

where $\phi_e$ represents a common phase error of the reference carrier signals $L_1$ and $L_2$ relative to the x and y axes, respectively. Under the circumstances, the first and second detection signals $S_1$ and $S_2$ are given by:

$$\begin{aligned} S_1 &= (G_{11} + G_{21}/2)\cos\phi_e - (G_{12} + G_{22}/2)\sin\phi_e \\ \text{and} \\ S_2 &= (G_{11} + G_{21}/2)\sin\phi_e + (G_{12} + G_{22}/2)\cos\phi_e. \end{aligned} \quad (3)$$

Turning back to FIG. 2 temporarily, the first and second discriminators 26 and 27 produce the first and second more significant output signals $\hat{S}_1$ and $\hat{S}_2$ by comparing the detection levels of the first and second detection signals $S_1$ and $S_2$ with a first predetermined level, such as the intermediate level. When the phase error $\phi_e$ is reduced to zero, the discriminators 26 and 27 produce the first path signal, namely, the combination of the data pulse signals $G_{11}$ and $G_{12}$, as the more significant output signals $\hat{S}_1$ and $\hat{S}_2$ because it is then clear from Equations (3) that:

$$\hat{S}_1 = G_{11} \text{ and } \hat{S}_2 = G_{12}. \quad (4)$$

The re-modulated signal is therefore a four-phase modulated signal L given by:

$$L = -G_{11}\sin(\omega_c t + \phi_e) + G_{12}\cos(\omega_c t + \phi_e). \quad (5)$$

A comparison result signal E produced by the phase comparator is:

$$E = -[G_{11}^2 + G_{12}^2 + (G_{11}G_{21} + G_{12}G_{22})/2]\sin\phi_e - [(G_{11}G_{22} - G_{12}G_{21})/2]\cos\phi_e \quad (6)$$

when the input signal S were a mere four-phase modulated signal having no components resulting from the second path signal, namely, the other combination of the digital pulse signals $G_{21}$ and $G_{22}$, Equation (6) would become:

$$E = -2\sin\phi_e \quad (7)$$

and would be independent of the data pulse signals $G_{11}$ and $G_{12}$ because $G_{11}^2 = G_{12}^2 = 1$. It is mandatory, however, that at least the second path signal, namely, the other combination of the data pulse signals $G_{21}$ and $G_{22}$, is present in the input signal S subjected to amplitude-and-phase modulation. The comparison result signal E therefore includes a residual component that is given by the second term of the right-hand side of Equation (6) and takes one of three values $\pm 1$ and 0 even when the phase error $\phi_e$ is reduced to zero. The residual component may be rendered zero in average if the data pulse signals vary independently of one another and continue, in an ideal case, infinitely. It results, however, in practice that the residual component falls within a noise band width of the feedback loop and remains to introduce jitters into the first reference carrier signal $L_1$.

Referring to FIG. 3 again, the demodulator comprises first and second quantizer sections 36 and 37 for quantizing the first and second detection signals $S_1$ and $S_2$ into the first and second output signal pairs $\hat{S}_1$, $\hat{S}_1'$ and $\hat{S}_2$, $\hat{S}_2'$, respectively. Equations (3) show when the phase error $\phi_e$ is reduced to zero in the first and second reference carrier signals $L_1$ and $L_2$ that the four different detection levels mentioned hereinabove are equal to a predetermined highest and a predetermined lowest level and two additional levels. Inasmuch as the data pulse signals $G_{11}$ through $G_{22}$ take the +1 and/or the −1 levels, the highest and lowest levels are the levels of +3/2 and −3/2 with a predetermined intermediate level, such as a zero level, interposed therebetween while the two additional levels, the levels of +178 and −⅓. With the highest and lowest levels represented by $V_0$ and $-V_0$, the additional levels are $\pm V_0/3$. The above-mentioned quantization is into first through fourth quantization levels $2V_0/3$, $V_0/3$, $-V_0/3$, and $-2V_0/3$.

In the example illustrated in FIG. 3, the first quantizer section 36 comprises a first quantization circuit 41 comprising, in turn, a comparator and a decoder (both not shown). Connected to the first phase detector 21, the comparator compares the detection level of the first detection signal $S_1$ with the intermediate level to produce a first result signal representative of that side of the intermediate level on which the first detection level is present. The decoder decodes the first result signal into a first decoded signal of levels $2V_0/3$ and $-2V_0/3$ when the first detection level is higher and lower, respectively, than the intermediate level. The first decoded signal corresponds to the first more significant output signal $\hat{S}_1$ of the conventional demodulator. A first subtractor 42 subtracts the first decoded signal $\hat{S}_1$ from the first detection signal $S_1$ to produce a first difference signal $D_1$ of a first difference level that is given by:

$$D_1 = S_1 - \hat{S}_1 = G_{11}(\cos\phi_e - 1) + (G_{21}/2)\cos\phi_e - (G_{12} + G_{22}/2)\sin\phi_e \quad (8)$$

and therefore is approximately equal to $V_0/3$ and $-V_0/3$ when the first detection level is either $V_0$ or $-V_0/3$ and when the first detection level is either $V_0/3$ or $-V_0$, respectively. The first difference signal $D_1$ is supplied to a second quantization circuit 43 and a second subtractor 44. Like the first quantization circuit 41, the second quantization circuit 43 produces in response to the intermediate level a second decoded signal that has quantization levels $V_0/3$ and $-V_0/3$ when the levels of the first difference signal $D_1$ are nearly equal to $V_0/3$ and $-V_0/3$, respectively. When the phase error $\phi_e$ is reduced substantially to zero, the first difference signal $D_1$ becomes:

$$D_1 = (G_{21}/2)\cos\phi_e, \quad (9)$$

with the result that the second decoded signal is brought into correspondence to the first less significant output signal $\hat{S}_1'$, namely:

$$\hat{S}_1' = G_{21}/2. \quad (10)$$

The second subtractor 44 produces a second difference signal or a first quantization error signal $D_2$ given by:

$$D_2 = D_1 - \hat{S}_1' = (G_{11} + G_{21}/2)(\cos\phi_e - 1) - (G_{12} + G_{22}/2)\sin\phi_e \quad (11)$$

The first output signal pair $\hat{S}_1$ and $\hat{S}_1'$ is supplied through the first output terminal pair 13 and 14. Use may be made of a summing circuit (not shown), which produces a first quantized signal of a first level determined by the quantization levels $2V_0/3$, $V_0/3$, $-V_0/3$, and $-2V_0/3$ to be equal to the detection level of the first detection signal $S_1$ with a first minimum difference. In other words, the first and second decoded signals $\hat{S}_1$ and $\hat{S}_1'$ are a first and a second portion of the first quantized signal. As the case may be, it is possible to supply the first result signal and a second result signal similar thereto to a utilization circuit (not shown) directly from the comparators included in the first and second quantization circuits 41 and 43.

The second quantizer section 37 illustrated in FIG. 3 comprises a third quantization circuit 46, a third subtractor 47, a fourth quantization circuit 48, and a fourth subtractor 49 corresponding to the circuit elements 41 through 44 of the first quantizer section 36. It will therefore readily be understood that a third difference signal $D_3$ produced by the third subtractor 47 is given by:

$$D_3 = S_2 - \hat{S}_2 = G_{12}(\cos\phi_e - 1) + (G_{22}/2)\cos\phi_e + (G_{11} + G_{21}/2)\sin\phi_e \qquad (12)$$

and, when the phase error $\phi_e$ is nearly equal to zero, by:

$$\text{ti } D_3 = (G_{22}/2)\cos\phi_e. \qquad (13)$$

A fourth decoded signal $\hat{S}_2'$ (a third one $\hat{S}_2$ being produced by the third quantization circuit 46) produced by the fourth quantization circuit 48 is given by:

$$\hat{S}_2' = G_{22}/2. \qquad (14)$$

A fourth difference signal or a second quantization error signal $D_4$ produced by the fourth subtractor 49 is given by:

$$D_4 = D_3 - \hat{S}_2' = (G_{12} + G_{22}/2)(\cos\phi_e - 1) + (G_{11} + G_{21}/2)\sin\phi_e. \qquad (15)$$

It will also readily be understood that the quantization levels for the second quantizer section 37 may not quite exactly coincide with those for the first quantizer section 36 but may be different from the latter quantization levels with allowable errors.

Further referring to FIG. 3, it may be mentioned here that the first and third decoded signals or the first and second mode significant output signals represent those sides of the intermediate level on which the detection levels of the first and second detection signals $S_1$ and $S_2$, respectively, are present and may be called a first and a second coded signal, respectively. The quantizer sections 36 and 37 therefore produce, the first and second quantization signals, the first and second coded signals $\hat{S}_1$ and $\hat{S}_2$, and the difference signals representative of the first and second minimum differences. The demodulator comprises a first multiplier 51 for multiplying the first quantization error signal $D_2$ by the second coded signal $\hat{S}_2$ to produce a first product signal $P_1$, a second multiplier 52 for multiplying the second quantization error signal $D_4$ by the first coded signal $\hat{S}_1$ to produce a second product signal $P_2$, and a subtraction circuit 53 for subtracting the second product signal $P_2$ from the first product signal $P_1$ to produce a single difference signal D described below. Inasmuch as each of the coded signals $\hat{S}_1$ and $\hat{S}_2$ takes either a positive or a negative value, each of the multipliers 51 and 52 may be a mere switching circuit for producing the pertinent one of the difference signals $D_2$ and $D_4$ in an inphase and an antiphase manner when the polarity of the coded signal $\hat{S}_1$ and $\hat{S}_2$ is positive and negative, respectively. The multipliers 51 and 52 thus cancel that polarity discrepancy of the quantization error signals $D_2$ and $D_4$ which result from the difference in the quadrants where the information points $S_{11}$ and the like are present. The single difference signal D is therefore given by:

$$D = P_1 - P_2 = D_2 \cdot \hat{S}_2 - D_4 \cdot \hat{S}_1 = -(G_{11}^2 + G_{12}^2 + G_{11}G_{21}/2 + G_{12}G_{22}/2)\sin\phi_e - (G_{11}G_{22} - G_{12}G_{21})(\cos\phi_e - 1)/2. \qquad (16)$$

The single difference signal D is supplied to the voltage controlled oscillator 31 through a loop filter 55 known in the art. It is obvious from Equations (16) that the single difference signal D is dependent on the phase error $\phi_e$ between the input and the first reference carrier signals S and $L_1$. Compared with Equation (6), the second term in the last side of Equations (16) is dependent on $(\cos\phi_e - 1)$ rather than on $\cos\phi_e$. Accordingly, the second term for the demodulator according to this invention is negligibly small when the phase error $\phi_e$ is sufficiently smaller than 1 radian.

In connection with the demodulators illustrated so far with reference to FIGS. 2 and 3, it may be mentioned here that the first or second more significant and less significant output signals $\hat{S}_1$ and $\hat{S}_1'$ or $\hat{S}_2$ and $\hat{S}_2'$ produced by the conventional demodulator are of the same level in absolute value while the first and second or the third and fourth decoded signals $\hat{S}_1$ and $\hat{S}_1'$ or $\hat{S}_2$ and $\hat{S}_2'$ of the demodulator according to the first embodiment have different levels even in absolute value. In order to use these signals for data pulses, conventional level converters should be connected to at least one each of the output terminal pairs, such as 14 and 16. At any rate, a demodulator according to this invention is capable of reducing the jitter to a minimum with a simple and accordingly inexpensive carrier reproduction circuit. It will readily be understood from the above that this invention is applicable to demodulation of an amplitude-and-phase modulated signal having n by n levels and that each quantizer section 36 or 37 should comprise in this case at least one quantization circuit accompanied by a subtractor, $\log_2 n$ in number when $\log_2 n$ is an integer and otherwise $[\log_2 n] + 1$ in number, where the brackets are used as the Gauss' notation.

Figure 4:
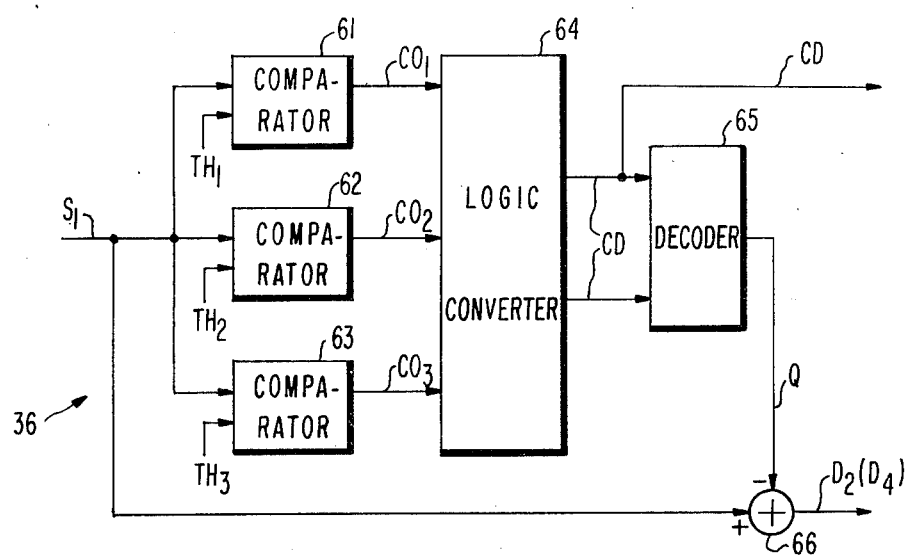
FIG. 4 is a block diagram of a quantizer section of a demodulator according to a second embodiment of this invention.

Referring to FIG. 4, a demodulator according to a second embodiment of this invention is similar to that according to the first embodiment except for the first and second quantizer sections 36 and 37. Merely for simplicity of description, it is again presumed that the demodulator according to the second embodiment is for the amplitude-and-phase modulated signal illustrated with reference to FIG. 1 and that the detection levels of the first and second detection signals $S_1$ and $S_2$ are between the predetermined highest and lowest levels $V_0$ and $-V_0$. Inasmuch as the quantizer sections 36 and 37 are same in structure, description will be made hereunder of only the first quantizer section 36 of the demodulator according to the second embodiment. The quantizer section 36 comprises three comparators 61, 62, and 63 responsive to first through third predetermined threshold levels $TH_1$, $TH_2$, and $TH_3$, equal to $V_0/2$, 0, and $-V_0/2$ in the example being described, respectively, for simultaneously comparing the detection level of the first detection signal $S_1$ with the threshold levels $TH_1$ through $TH_3$ to produce first through third result signals $CO_1$, $CO_2$, and $CO_3$. The result signals $CO_1$ through $CO_3$ are representative of whether or not the first detection level is higher than the respective threshold levels $TH_1$ through $TH_3$. This means that the comparators 61 through 63 divide the detection level into four discrete levels. Responsive to the result signals $CO_1$ through $CO_3$, a logic converter 64 produces a coded signal CD of first and second bits which are representative of the four discrete levels. The signal bits are preferably bipolar. The first bit is representative of the polarity of the detection signal $S_1$ relative to the intermediate one of the threshold levels $TH_1$ through $TH_3$ and thus indicative of that side of the intermediate threshold level on which the detection level is present. The second bit is representative, in the indicated side, of that side of the higher or lower one of the threshold levels on which the detection level is present. The first bit is supplied to the second multiplier 52 (FIG. 3) as the first side signal. Supplied with the coded signal CD, a decoder 65 produces as the demodulated signal a quantized signal Q having one of the quantization levels that corresponds to the level of the detection signal $S_1$. The first quantizer section 36 further comprises a subtractor 66 for subtracting the quantized signal Q from the detection signal $S_1$ to produce the quantization error signal that corresponds to the second difference signal $D_2$ in the demodulator according to the first embodiment. It will readily be understood that the illustrated quantizer section 36 is capable of processing the detection signal $S_1$ at a higher speed as compared with that described with reference to FIG. 3. But its configuration is more complicated.

Figure 5:
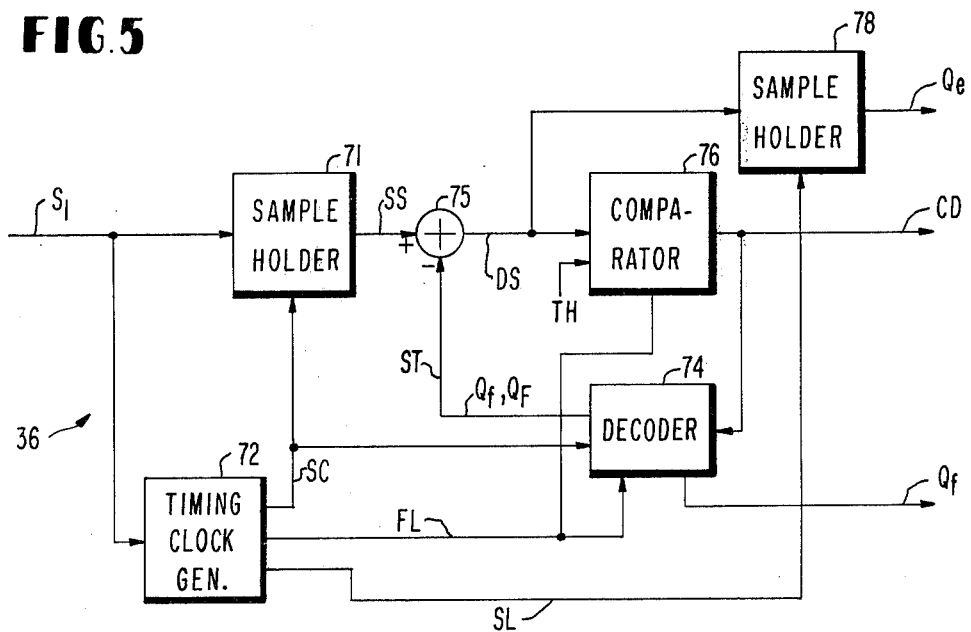
FIG. 5 is a block diagram of a quantizer section of a demodulator according to a third embodiment of this invention.

Referring to FIG. 5, a demodulator according to a third embodiment of this invention is again similar to that according to the first embodiment except for the first and second quantizer section 36 and 37. The first quantizer section 36 of the demodulator according to the third embodiment produces the quantized signal Q, the coded signal, and the quantization error signal by dealing with the detection signal $S_1$ in a time division fashion where the quantizer section 36 illustrated with reference to FIG. 4 does in a space divison fashion. The coded and quantization error signals are herein designated by $Q_f$ and $Q_e$, respectively. The detection signal $S_1$ is supplied to a sample holder 71 and a timing clock generator 72. Responsive to the detection signal $S_1$, the timing clock generator 72 is for producing a sampling signal SC of a sampling period preselected with reference to the repetition period of the amplitude-and-phase modulated signal and first and second clock signals FL and SL described later. Supplied with the sampling signal SC, the sample holder 71 holds the detection signal $S_1$ for each of the sampling periods to produce a sampled signal SS of a sampled level equal to the instantaneous value of the detection level at the sampling instant. Supplied also with the sampling signal SC, a decoder 74 is preliminarily reset to initially give as a subtrahend signal ST of a variable level a predetermined reference level (for example, the 0 level). The subtraction signal level is variable within each of the sampling periods at a frequency determined in accordance with the number of quantization levels. A subtractor 75 subtracts the subtrahend signal ST from the sampled signal SS to produce a difference signal DS of a difference level variable within each of the sampling periods. Connected to the subtractor 75, a comparator 76 retains a predetermined threshold level TH equal to the predetermined level of the detection signal level. The comparator 76 is supplied with the first clock signal FL having a repetition period equal to a half of that of the sampling clock signal SC when the quantized signal Q is of four quantization levels. The comparator 76 compares the difference level of the difference signal DS with the threshold level TH to successively produce a sequence of two bits of a coded signal CD in each of the repetition period of the first clock signal FL. The first bit of the coded signal CD usually represents the polarity of the sampled signal SS relative to the threshold level TH. Retaining four quantization levels, the decoder 74 successively decodes the bits of the coded signal CD to produce as the subtrahend signal ST a decoded signal. In a first half of each sampling period, the decoder 74 decodes the first bit of the coded signal CD produced for the first time in each of the sampling periods and produces a first quantized signal $Q_f$ of one of the first and fourth quantized levels, for example, $2V_0/3$ or $-2V_0/3$. The first quantized signal $Q_f$ is supplied as the first coded signal to the second multiplier 58 (FIG. 3). The subtractor 75 subtracts the first quantized signal $Q_f$ from the sampled signal SS to produce a former half of the difference signal DS of a level representative of the difference between the quantized and sampled levels. The comparator 76 now compares the varied level with the threshold level TH to produce the second bit of the coded signal CD for the second time of the sampling period. In the latter half of each sampling period, the decoder 74 produces a second quantized signal $Q_F$ representative of a quantization level to be equal to the first detection level with a minimum difference. The subtractor 75 subtracts the second quantized signal $Q_F$ from the sampled signal SS to produce a second half of the difference signal DS. The second clock signal SL is produced at the end of each of the sampling periods and supplied to a sample holder 78 and a gate circuit 79. The sample holder 78 holds the second half of the difference signal DS, which serves as the quantization error signal $Q_e$.

While the above description is mainly made of the amplitude-and-phase modulated signal having four by four levels, this invention is applicable to a signal having n by n levels. In this case, each detection signal is coded into a coded signal of $\log_2 n$ or $[\log_2 n] + 1$ bits by each of the first and second quantizer sections 36 and 37. The first and second quantizer sections 36 and 37 produce the first and second quantization error signals. The first bit of each of the coded signals is usually representative of the polarity of the detection signal relative to an intermediate level between a highest and lowest level thereof. In addition, each of the first and second quantizer sections 36 and 37 discriminates a quantization level nearest to the detection signal with a minimum difference.

With reference to FIGS. 1 and others, the input signal S has been presumed to be subjected to no frequency band limitation. This invention is, however, applicable even when the input signal S is subjected to whatever band limitation. In this case, the signal vectors shown in FIG. 1 make transitions from one to another with a finite time. This causes an undesired signal to occur in the quantization error signal so that the jitter in the recovered carrier signal increases. To remove the undesired signal, each of the output signals of the first through fourth quantization circuits may be supplied to each subtractor through a low pass filter having a characteristic substantially equivalent to the band limitation characteristic resorted to. This enables code reproduction to be carried out with a high precision. This technique is substantially similar in principle to that of a carrier recovery circuit described in Japanese patent application No. 44988/1976. Accordingly, this combination is useful for recovering a reference carrier signal with reduced jitters and for reproducing a data signal with a high precision.

What is claimed is:

1. A demodulator for deriving demodulated signals from an input signal of input levels and input phases subjected to amplitude-and-phase modulation, comprising variable frequency means responsive to a control signal for producing a first reference carrier signal of a frequency and a first phase dependent on said control signal and a second reference carrier signal of said frequency and a second phase having a quadrature phase difference relative to said first phase, first coherent detection means responsive to said first reference carrier signal for detecting said input signals to produce a first detection signal of a first detection level dependent on said input levels and input phases, and second coherent detection means responsive to said second reference carrier signal for detecting said input signals to produce a second detection signal of a second detection level dependent on said input levels and input phases, each of said first and second detection levels being variable between a predetermined highest and a predetermined lowest level, inclusive, on both sides of an intermediate level preselected between said highest and lowest levels, wherein the improvement comprises:

first means responsive to at least one reference level comprising said intermediate level and to said first detection signal for producing a first quantized signal, a first coded signal, and a first quantization error signal, said first quantized signal having one of a plurality of quantization levels predetermined between said highest and lowest levels that is determined by said first detection level to be equal thereto with a first minimum difference, said first side signal being representative of a first and a second predetermined value when said first detection level is between said highest and intermediate levels and between said intermediate and lowest levels, respectively, said first quantization error signal being representative of said first difference;

second means responsive to said at least one reference level and to said second detection signal for producing a second quantized signal, a second coded signal, and a second quantization error signal, said second quantized signal having one of said quantization levels that is determined by said second detection level to be equal thereto with a second minimum difference, said second coded signal being representative of said first and second predetermined values when said second detection level is between said highest and intermediate levels and between said intermediate and lowest levels, respectively, said second quantization error signal being representative of said second difference;

a first multiplier for multiplying said first quantization error signal by second coded signal to produce a first product signal;

a second multiplier for multiplying said second quantization error signal by said first coded signal to produce a second product signal;

a subtractor for subtracting one of said first and second product signals from the other to produce a difference signal;

means for supplying said difference signal to said variable frequency means as said control signal; and, means for producing said first and second quantized signals as said demodulated signals.

2. A demodulator as claimed in claim 1, said quantization levels consisting of a first, a second, a third, and a fourth quantization level preselected between said highest and intermediate levels, between said first quantization and intermediate levels, between said intermediate and lowest levels, and between said third quantization and lowest levels, respectively, wherein said first means comprises:

first quantization means responsive to said intermediate and first and fourth quantization levels and connected to said first coherent detection means for producing a first result signal that has said first and fourth quantization levels when the detection signal level of said first detection signal is higher and lower than said intermediate level, respectively;

a first subtractor for subtracting said first result signal from said first detection signal to produce a first difference signal of a first difference level equal to the difference between the levels of said first result and first detection signals;

means for supplying as said first coded signal said first result signal to said second multiplier;

second quantization means responsive to said intermediate and second and third quantization levels and connected to said first subtractor for producing a second result signal that has said second and third quantization levels when said first difference level of said first difference signal is higher and lower than said intermediate level, respectively;

a second subtractor for subtracting said second result signal from said first difference signal to produce a second difference signal of a second difference level equal to the difference between the levels of said second result and first difference signals;

means for supplying said second difference signal to said second multiplier as said first quantization error signal; and means for producing said first and second result signals as a first and a second portion of said first quantized signal;

said second means comprising:

third quantization means responsive to said intermediate and first and fourth quantization levels and connected to said second coherent detection means for producing a third result signal that has said first and fourth quantization levels when the detection signal level of said second detection signal is higher and lower than said intermediate level, respectively;

a third subtractor for subtracting said third result signal from said second detection signal to produce a third difference signal of a third difference level equal to the difference between the levels of said third result and third difference signals;

means for supplying as said second coded signal said third result signal to said first multiplier;

fourth quantization means responsive to said intermediate and first and fourth quantization levels and connected to said third subtractor for producing a fourth result signal that has said second and third quantization levels when said third difference level of said third difference signal is higher and lower than said intermediate level, respectively;

a fourth subtractor for subtracting said fourth result signal from said third difference signal to produce a fourth difference signal of a fourth difference level equal to the difference between the levels of said fourth result and third difference signals;

means for supplying said fourth difference signal to said first multiplier as said second quantization error signal; and means for producing said third and fourth result signals as a first and a second portion of said second quantized signal.

3. A demodulator as claimed in claim 1, wherein said first means comprises:

first quantization means responsive to said intermediate level and a plurality of additional reference levels and connected to said first coherent detection means for simultaneously producing said first quantized signal and said first coded signal; and first subtraction means for subtracting said first quantized signal from said first detection signal to produce said first quantization error signal;

said second means comprising:

second quantization means responsive to said intermediate level and a plurality of additional reference levels and connected to said second coherent detection means for simultaneously producing said second quantized signal and said second coded signal; and second subtraction means for subtracting said second quantized signal from said second detection signal to produce said second quantization error signal.

4. A demodulator as claimed in claim 1, further comprising means for regenerating from said first detection signal a first sampling signal of a sampling period preselected with reference to said amplitude-and-phase modulation and means for regenerating a second sampling signal of said sampling period from said second detection signal, wherein said first means comprises:

a first sample holder responsive to said first sampling signal for holding said first detection signal for each of the sampling periods to produce a sequence of first detection signal samples of a first sample level equal to the instantaneous value of said first detection level at said each sampling period;

a first subtractor for subtracting a first subtrahend signal of a variable level from each of said samples to produce a first difference signal of a first difference level equal to the difference between the first sample level of said each of the first detection signal samples and said variable level, said first subtrahend signal level being variable within each of said sampling periods at a frequency in accordance with the number of said quantization levels;

a first comparator retaining said intermediate level and connected to said first subtractor for successively comparing said first difference level with said intermediate level to produce a sequence of those bits of a coded signal which are representative of which of said first difference level and said intermediate level is higher;

a first decoder retaining said quantization levels for successively decoding the bits of said coded signal to produce a decoded signal of a level variable in each of said sampling periods;

means for supplying said decoded signal to said first subtractor as said first subtrahend signal;

means responsive to a predetermined one of said quantization levels for decoding that bit of said coded signal to produce said first coded signal which is produced by said first decoder for the first time in each of said sampling periods; and means responsive to said sampling signal for producing as said first quantization error signal the first difference signal of the first difference level given by the level said decoded signal has at the end of each of said sampling periods;

said second means comprising:

a second sample holder responsive to said second sampling signal for holding said second detection signal for each of the sampling periods to produce a sequence of second detection signal samples of a second sample level equal to the instantaneous value of said second detection level at said each sampling period;

a second subtractor for subtracting a second subtrahend signal of a variable level from each of said samples to produce a second difference signal of a second difference level equal to the difference between the second sample level of said each of the second detection signal samples and said variable level, said second subtrahend signal level being variable within each of said sampling periods at a frequency in accordance with number of said quantization levels;

a second comparator retaining said intermediate level and connected to said second subtractor for successively comparing said second difference level with said intermediate level to produce a sequence of those bits of a coded signal which are representative of which of said second difference level and said intermediate level is higher;

a second decoder retaining said quantization levels for successively decoding the bits of said coded signal to produce a decoded signal of a level variable in each of said sampling periods;

means for supplying said decoded signal to said second subtractor as said second subtrahend signal;

means responsive to a predetermined one of said quantization levels for decoding that bit of said coded signal to produce said second coded signal which is produced by said second decoder for the first time in each of said sampling periods; and, means responsive to said sampling signal for producing as said second quantization error signal the second difference signal of the second difference level given by the level said decoded signal has at the end of each of said sampling periods.

* * * * *

UNITED STATES PATENT AND TRADEMARK OFFICE
CERTIFICATE OF CORRECTION

PATENT NO. : 4,134,075
DATED : January 9, 1979
INVENTOR(S) : Makoto WASHIO et al It is certified that error appears in the above-identified patent and that said Letters Patent are hereby corrected as shown below:

Column 6, line 8 - delete " + 178 " insert -- + 1/2 --

Column 7, line 23 - delete " ti "

line 43 - delete "mode" insert -- more --

Signed and Sealed this

Twenty-fourth Day of April 1979

[SEAL]

Attest:

RUTH C. MASON
Attesting Officer

DONALD W. BANNER
Commissioner of Patents and Trademarks